United States Patent
Chen et al.

(10) Patent No.: US 11,895,426 B2
(45) Date of Patent: ***Feb. 6, 2024

(54) METHOD AND APPARATUS FOR CAPTURING VIDEO, ELECTRONIC DEVICE AND COMPUTER-READABLE STORAGE MEDIUM

(71) Applicant: BEIJING MICROLIVE VISION TECHNOLOGY CO., LTD, Beijing (CN)

(72) Inventors: Haidong Chen, Beijing (CN); Yipeng Hao, Beijing (CN); Haiting Wang, Beijing (CN); Junjie Lin, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 22 days.

This patent is subject to a terminal disclaimer.

(21) Appl. No.: 16/980,213

(22) PCT Filed: Dec. 26, 2018

(86) PCT No.: PCT/CN2018/124066
§ 371 (c)(1),
(2) Date: Sep. 11, 2020

(87) PCT Pub. No.: WO2020/077856
PCT Pub. Date: Apr. 23, 2020

(65) Prior Publication Data
US 2021/0014431 A1 Jan. 14, 2021

(30) Foreign Application Priority Data

Oct. 19, 2018 (CN) .......................... 201811223788.7

(51) Int. Cl.
*H04N 5/272* (2006.01)
*G06F 3/16* (2006.01)
(Continued)

(52) U.S. Cl.
CPC ............. *H04N 5/272* (2013.01); *G06F 3/165* (2013.01); *H04N 5/2621* (2013.01); *H04N 23/62* (2023.01); *H04N 23/631* (2023.01)

(58) Field of Classification Search
CPC .............. H04N 5/272; H04N 5/23216; H04N 5/232933; H04N 5/2621; H04N 5/772;
(Continued)

(56) References Cited

U.S. PATENT DOCUMENTS

| 9,349,414 B1 * | 5/2016 | Furment .............. H04N 23/611 |
| 2003/0021589 A1 * | 1/2003 | Lin ...................... H04N 9/8227 386/E9.04 |

(Continued)

FOREIGN PATENT DOCUMENTS

| CN | 104394481 A | 3/2015 |
| CN | 104967902 A | 10/2015 |

(Continued)

OTHER PUBLICATIONS

Quora—How do you record a Reaction video and the video your reacting too simultaneously?, retrieved from https://www.quora.com/How-do-you-record-a-Reaction-video-and-the-video-your-reacting-too-simultaneously on Aug. 13, 2022 (Year: 2017).*

(Continued)

*Primary Examiner* — Timothy J Henn
(74) *Attorney, Agent, or Firm* — BakerHostetler (57) ABSTRACT

Embodiments of the present disclosure provide a method and apparatus for capturing video, an electronic device and a computer-readable storage medium. The method includes: receiving a video capture trigger operation from a user via (Continued)

a video playing interface for an original video; superimposing a video capture window on the video playing interface, in response to the video capture trigger operation; receiving a video capture operation from the user via the video playing interface: and capture a user video in response to the video capture operation, and displaying the user video via the video capture window. According to the embodiments of the present disclosure, a user only needs to perform operations related to capturing a user video on the video playing interface, thereby implementing a function of combining video, and the operation process is simple and fast. The user video can represent the user's feelings, comments, or viewing reactions to the original video. Therefore, the user can conveniently display its views or reactions to the original video, thereby improving interactive experience of user.

12 Claims, 5 Drawing Sheets

(51) Int. Cl.
*H04N 5/262* (2006.01)
*H04N 23/62* (2023.01)
*H04N 23/63* (2023.01)

(58) Field of Classification Search
CPC ...... H04N 5/262; H04N 23/62; H04N 23/631; G06F 3/165
See application file for complete search history.

(56) References Cited

U.S. PATENT DOCUMENTS

| | | | |
|---|---|---|---|
| 2011/0029874 A1* | 2/2011 | Profitt | H04R 5/04 348/565 |
| 2011/0037711 A1 | 2/2011 | Siddiqui et al. | |
| 2011/0279852 A1 | 11/2011 | Oda et al. | |
| 2013/0235224 A1* | 9/2013 | Park | H04N 5/2621 348/218.1 |
| 2015/0015690 A1* | 1/2015 | Roh | G06F 3/005 348/77 |
| 2017/0068380 A1 | 3/2017 | Hong et al. | |
| 2018/0247343 A1 | 8/2018 | Higashi | |
| 2020/0090703 A1* | 3/2020 | Tordjman | G11B 27/031 |

FOREIGN PATENT DOCUMENTS

| | | |
|---|---|---|
| CN | 104994314 A | 10/2015 |
| CN | 105898133 A | 8/2016 |
| CN | 107920274 A | 4/2018 |
| CN | 108566519 A | 9/2018 |
| CN | 108989692 A | 12/2018 |
| JP | 2011-238125 A | 11/2011 |
| JP | 2015-161848 A | 9/2015 |
| JP | 2017-157915 A | 9/2017 |
| JP | 2018-142229 A | 9/2018 |
| KR | 2003-0041034 A | 5/2003 |

OTHER PUBLICATIONS

How do I know the date on which a question was asked on Quora?—retrived from https://www.quora.com/How-do-I-know-the-date-on-which-a-question-was-asked-on-Quora on May 5, 2023 (Year: 2023).*
How do you record a Reaction video and the video your reacting too simultaneously? Question Log, retrieved from https://www.quora.com/How-do-you-record-a-Reaction-video-and-the-video-your-reacting-too-simultaneously/log on May 5, 2023 (Year: 2023).*
How can we find out the date of Quora answers?—retrieved from https://www.quora.com/How-can-we-find-out-the-date-of-Quora-answers on May 5, 2023 (Year: 2023).*
International Patent Application No. PCT/CN2018/124066; Int'l Search Report; dated Jul. 15, 2019; 3 pages.
https://jingyan.baidu.com/article/ff42efa9fb7b16c19e2202f0.html; "How does Kuaishou co-produce with others in the same frame"; Baidu; Jun. 2018; accessed Sep. 10, 2020; 9 pages.
https://zhidao.baidu.com/question/937356854995873572.html; "flash as3 want to drag the picture up and down with mouse use while limiting the picture to a certain range"; Baidu; accessed Sep. 10, 2020; 2 pages.
https://jingyan.baidu.com/article/60ccbceba3e4e364cbb19710.html; "How does Douyin work together?"; Baidu; Jun. 2018; accessed Sep. 10, 2020; 21 pages.
https://jingyan.baidu.com/article/ab0b563052eb77c15afa7d9b.html; How does Kuaishou work with others?; Baidu; Aug. 2018; accessed Sep. 10, 2020; 8 pages.

* cited by examiner

METHOD AND APPARATUS FOR CAPTURING VIDEO, ELECTRONIC DEVICE AND COMPUTER-READABLE STORAGE MEDIUM

CROSS-REFERENCE TO RELATED APPLICATION

The present disclosure is the U.S. National Stage of International Application No. PCT/CN2018/124066, filed on Dec. 26, 2018, which claims the priority of the Patent Application No. 2018112237887, filed on Oct. 19, 2018, in the Chinese National intellectual Property Administration, the disclosure of which is herein incorporated by reference in its entirety for all purposes.

TECHNICAL FIELD

The present disclosure relates to the field of internet technologies, and in particular, to a method and apparatus for capturing, an electronic device and a computer-readable storage medium.

BACKGROUND ART

In a video interaction platform, a user can express their thoughts or viewing experience, in the form of video, on other videos in the platform, to achieve video interaction.

In the prior art, when a user wants to capture an interactive video based on a certain video in a video platform, an original video in the video platform is usually required to be downloaded and saved, then some professional video recording tools are used to complete the recording of the interactive video, and the completed interactive video is uploaded to the video platform. The entire capture process of interactive video cannot be completed only through the video platform, which reduces the interactive experience of user.

It can be seen that the existing interactive video recording methods are complex and the interaction experience of user is poor, which cannot meet actual application requirements of user.

SUMMARY OF THE INVENTION

In a first aspect, the present disclosure provides a method for capturing video, including:
receiving a video capture trigger operation from a user via a video playing interface for an original video;
superimposing a video capture window on the video playing interface, in response to the video capture trigger operation;
receiving a video capture operation from the user via the video playing interface; and
capture a user video in response to the video capture operation and displaying the user video via the video capture window.
In an embodiment of the present disclosure, the method further includes:
receiving a window movement operation with respect to the video capture window, from the user; and
adjusting the video capture window to a corresponding region in the video playing interface, in response to the window movement operation.
In an embodiment of the present disclosure, the adjusting the video capture window to a corresponding region in the video playing interface, in response to the window movement operation includes:
displaying a pre-configured window adjustment boundary line in the video playing interface, in response to the window movement operation, wherein, the window adjustment boundary line is configured to limit a display region of the video capture window;
determining a current display region of the video capture window based on the window movement operation and the window adjustment boundary line; and adjusting the video capture window to a corresponding position in the video playing interface based on the current display region.
In the embodiment of the present disclosure, the determining a current display region of the video capture window based on the window movement operation and the window adjustment boundary line includes:
determining a first display region of the video capture window based on the window movement operation;
determining the first display region as the current display region, if a distance between the first display region and any one of window adjustment boundary lines is not less than a set distance; and
determining a second display region as the current display region, if the distance between the first display region and any one of the window adjustment boundary lines is less than the set distance;
wherein, the second display region is a region generated by translating the first display region to any one of the window adjustment boundary lines, and at least one position point of the second display region overlaps with any one of the window adjustment boundary lines.
In an embodiment of the present disclosure, the capturing a user video in response to the video capture operation and displaying the user video via the video capture window, includes:
capturing the user video while playing the original video, in response to the video capture operation, and displaying the user video via the video capture window.
In an embodiment of the present disclosure, the method further includes:
receiving a window size adjustment operation with respect to the video capture window from the user; and
adjusting the video capture window to a corresponding display size, in response to the window size adjustment operation.
In an embodiment of the present disclosure, the method further includes:
receiving a special effect addition operation with respect to a special effect to be added from the user, via the video playing interface; and
adding the special effect to be added to the user video, in response to the special effect addition operation.
In an embodiment of the present disclosure, the method further includes: before capturing a user video in response to the video capture operation, and displaying the user video via the video capture window,
receiving a recording selection operation with respect to a recording mode for the user video, from the user, via the video playing interface, wherein, the recording mode includes at least one of a fast recording mode, a slow recording mode, and a standard recording mode; and
determining the recording mode for the user video based on the recording selection operation,
In an embodiment of the present disclosure, the method further includes:
combining the user video and the original video to obtain a combined video.

In an embodiment of the present disclosure, the method further includes:
  receiving a volume adjustment operation via the video playing interface, from the user; and
  adjusting volumes of an audio information of the user video and/or an audio information of the original video accordingly, in response to the volume adjustment operation.

In an embodiment of the present disclosure, the method further includes:
  providing an operation prompt option to the user, wherein, the operation prompt option is used to provide the user with a prompt information of a capture operation for the combined video upon receiving an operation from the user.

In a second aspect, the present disclosure provides an apparatus for capturing video, including:
  a trigger operation receiving module, configured to receive a video capture trigger operation from user via a video playing interface for an original video;
  a capture window display module, configured to superimpose a video capture window on the video playing interface, in response to the video capture trigger operation;
  a capture operation receiving module, configured to receive a video capture operation from the user via the video playing interface; and
  a user video capture module, configured to capture a user video in response to the video capture operation, and display the user video via the video capture window.

In an embodiment of the present disclosure, the apparatus further includes:
  a window position adjustment module, configured to receive a window movement operation with respect to the video capture window, from the user; and adjust the video capture window to a corresponding region in the video playing interface, in response to the window movement operation.

In an embodiment of the present disclosure, the window position adjustment module may be further configured to:
  display a pre-configured window adjustment boundary line in the video playing interface, in response to the window movement operation, wherein, the window adjustment boundary line is configured to limit a display region of the video capture window;
  determine a current display region of the video capture window based on the window movement operation and the window adjustment boundary line; and
  adjust the video capture window to a corresponding position in the video playing interface based on the current display region.

In an embodiment of the present disclosure, the window position adjustment module may be further configured to:
  determine a first display region of the video capture window based on the window movement operation;
  determine the first display region as the current display region, if a distance between the first display region and any one of window adjustment boundary lines is not less than a set distance; and
  determine a second display region as the current display region, if the distance between the first display region and any one of the window adjustment boundary lines is less than the set distance;
  wherein, the second display region is a region generated by translating the first display region to any one of the window adjustment boundary lines, and at least one position point of the second display region overlaps with any one of the window adjustment boundary lines.

In an embodiment of the present disclosure, the user video capture module may be further configured to:
  capture the user video while playing the original video, in response to the video capture operation, and display the user video via the video capture window.

In an embodiment of the present disclosure, the apparatus further includes:
  a window size adjustment module, configured to receive a window size adjustment operation with respect to the video capture window from the user; and adjust the video capture window to a corresponding display size, in response to the window size adjustment operation.

In an embodiment of the present disclosure, the apparatus further includes:
  a special effect addition module, configured to receive a special effect addition operation with respect to a special effect to be added, from the user, via the video playing interface; and add the special effect to be added to the user video, in response to the special effect addition operation.

In the embodiment of the present disclosure, the user video capture module may be further configured to:
  before capturing a user video in response to the video capture operation and displaying the user video via the video capture window, receive a recording selection operation with respect to a recording mode for the user video, from the user, via the video playing interface; and determine the recording mode for the user video based on the recording selection operation, wherein, the recording mode includes at least one of a fast recording mode, a slow recording mode, and a standard recording mode.

In an embodiment of the present disclosure, the apparatus further includes:
  a combined video generation module, configured to combine the user video and the original video to obtain a combined video.

In an embodiment of the present disclosure, the apparatus further includes:
  a volume adjustment module, configured to receive a volume adjustment operation via the video playing interface, from the user; and adjust volumes of an audio information of the user video and/or an audio information of the original video accordingly, in response to the volume adjustment operation.

In an embodiment of the present disclosure, the apparatus further includes:
  an operation prompt module, configured to provide an operation prompt option to the user, wherein, the operation prompt option is used to provide the user with a prompt information of a capture operation for the combined video upon receiving an operation from the user.

In a third aspect, the present disclosure provides an electronic device including a processor and a memory,
  wherein, the memory is configured to store computer operation instruction; and
  the processor is configured to execute the method as shown in any one of embodiments in the first aspect of the present disclosure by invoking the computer operation instruction.

In a fourth aspect, the present disclosure provides a computer-readable storage medium that stores at least one operation, at least one program, code set or operation set, which is loaded and executed by a computer to implement the method as shown in any one of embodiments in the first aspect of the present disclosure.

THE DESCRIPTION OF DRAWINGS

In order to more clearly illustrate technical solutions in embodiments of the present disclosure, the drawings to be used in the description of the embodiments of the present disclosure will be briefly introduced below.

DETAILED DESCRIPTION OF THE PREFERRED EMBODIMENT

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by those skilled in the art that singular forms "a", "an", "the" and "said" may be intended to include plural forms as well, unless otherwise stated. It should be further understood that terms "include/comprise" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein may include wireless connection or wireless coupling. As used herein, the term "and/or" includes all or any of one or more associated listed items or combinations thereof.

The technical solutions of the present disclosure and how the technical solutions of the present disclosure solve the above technical problems will be described in detail below with reference to specific embodiments. The following specific embodiments may be combined with each other, and the same or similar concepts or processes may not be described in some embodiments any more. Embodiments of the present disclosure will be described below with reference to the accompanying drawings.

Figure 1:
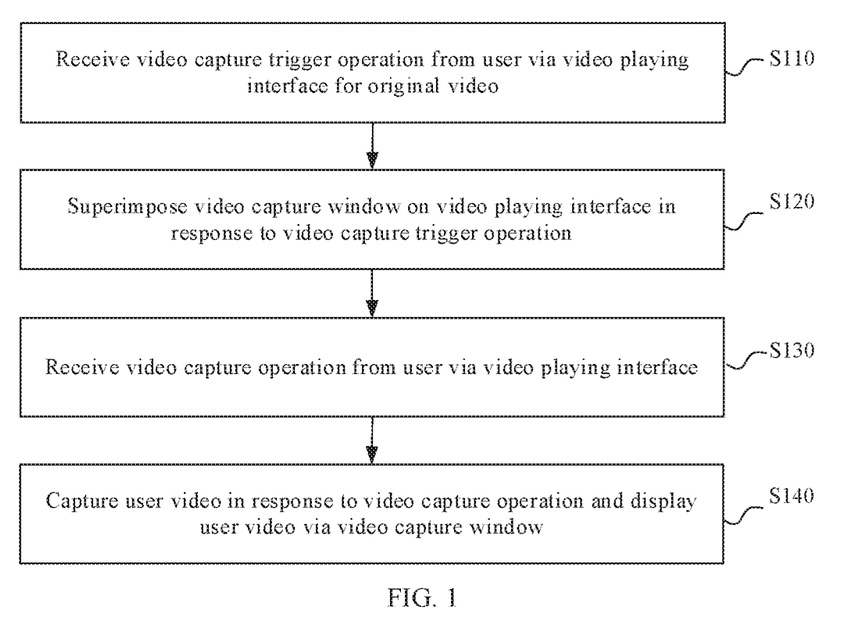
FIG. 1 is a schematic flowchart of a method for capturing video according to an embodiment of the present disclosure.

An embodiment of the present disclosure provides a method for capturing video. As shown in FIG. 1, the method may include:

Step S110, receiving a video capture trigger operation from a user via a video playing interface for an original video.

Wherein, the video capture trigger operation indicates that the user wants to capture the user video based on the original video in the video playing interface, that is, the user triggers an action to start to capture user video. The specific form of the operation is configured as required. For example, it can be a trigger action of an operating position in an application interface of a client. The video playing interface is used for the interaction between the terminal device and the user. Through this interface, the user can receive related operations on the original video, such as sharing or combining the original video, etc.

In actual applications, the operation can be triggered by an associated trigger identifier of the client, such as a specified trigger button or an input box on a client interface, or a user's voice. In one or more embodiments of present disclosure, it can be a "compose" virtual button displayed on an application interface of client. The operation of the user clicking the button is the video capture trigger operation from the user. In actual applications, the original video can be a video that has not been combined, or a video that has been obtained after combining.

Step S120, superimposing a video capture window on the video playing interface, in response to the video capture trigger operation.

In actual applications, the video capture window may be superimposed (superimposedly displayed) on or laid over a preset position in the video playing interface, and the preset position may be a display position pre-configured based on the size of display interface of the terminal device of user, for example, an upper left of the video playing interface. The size of the video capture window is smaller than a display window of the original video, so that the video capture window only obscures part of screen content of original video. The initial size of the video capture window can be configured according to actual requirements, and can be selected as reducing the obscuration of the original video screen and not affecting viewing the original video for the user, upon playing the original video, and not affecting viewing the recording screen for the user, upon capturing the user video. For example, the size of the video capture window displayed on the terminal device can be automatically adjusted according to the size of the display interface of the terminal device of user. For example, the video capture window is one-tenth or one-fifth of the display interface of the terminal device.

Step S130, receiving a video capture operation from the user via the video playing interface.

Similarly, the video playing interface includes associated trigger identifier for triggering the video capture operation, such as a specified trigger button or input box, or a voice command of user. In one or more embodiments of present disclosure, it can be a "capture" virtual button displayed on the application interface of client. The operation of the user clicking the button is the video capture trigger operation from the user. The video capture operation can trigger the capture function of the terminal device of user to obtain content to be captured by user, such as the user himself.

Step S140, capturing a user video in response to the video capture operation, and displaying the user video via the video capture window.

Wherein, the playing state of the original video is not limited upon capturing the user video, that is, the original video may be in a playing stale or in a state of being paused to an image of a certain video frame, based on actual requirements.

In actual applications, the original video may be a video that has not been combined or a combined video that has been obtained after composition.

It should be noted that the user video in the embodiment of the present disclosure may be selected as a video where the user is included, that is, the user video is a video where the user is captured. Alternatively, it can also be a video of other scenes recorded by user after adjustment as required.

According to the embodiment of the present disclosure, the user only needs to perform operations related to capturing a user video on the video playing interface, that is, the user video can be recorded on the basis of the original video via the video capture window, and the operation process is simple and fast. The user video can represent the user's feelings, comments, or viewing reactions to the original video. Therefore, the user can conveniently display its views or reactions to the original video, which can better meet actual application requirement of user, improve interactive experience of user, and improves fun of capturing video.

Figure 2:
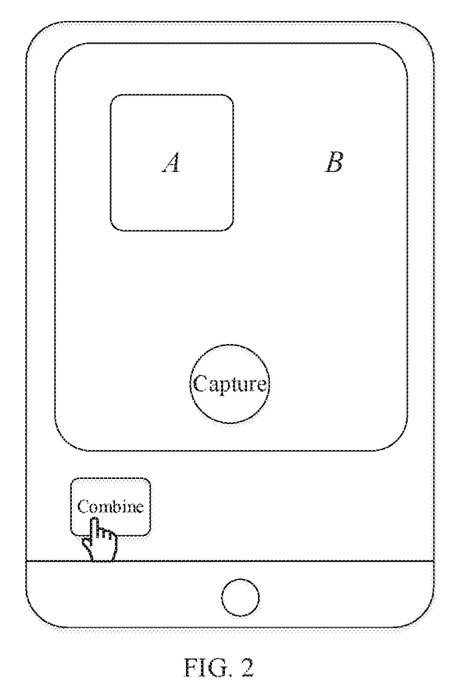
FIG. 2 is a schematic diagram of a video playing interface according to an embodiment of the present disclosure.

As an example, FIG. 2 shows a schematic diagram of a video playing interface for an original video of a client application in a terminal device. A "combine" (i.e., "co-capture", "superimpose", "re-act" or "re-post") virtual button displayed in the interface is a video capture trigger button, and the operation of user clicking this button is the video capture trigger operation from the user. In the video playing interface, after receiving the video capture trigger operation from the user, the video capture window A is superimposed on the video playing interface B. A "capture" virtual button displayed in the interface is a capture trigger button, and the operation of user clicking this button is the video capture operation from user. After receiving this operation, the user video is captured via the video capture window if to realize the function of capturing user video based on the original video.

It should be noted that in actual applications, the specific form of the video playing interface and the form of each button can be configured according to actual requirements, and the above example is only an optional implementation.

In the embodiment of the present disclosure, the shape of the video capture window is not limited, including a circle, a rectangle or other shapes, and can be configured according to actual requirements.

In an embodiment of the present disclosure, the method further includes:
receiving a window movement operation with respect to the video capture window, from the user; and
adjusting the video capture window to a corresponding region in the video playing interface, in response to the window movement operation.

Wherein, the user can adjust the position of the video capture window to meet the requirements of different users for the position of the video capture window in the video playing interface. In actual applications, the position of the video capture window can be adjusted by any one of the following window movement operations of user:

The first type: the user can adjust the position of the video capture window by dragging the video capture window through an operating object, such as a finger. When the operating object touches and drags the video capture window, it indicates that the position of the video capture window is adjusted. When the operating object leaves the video capture window, that is, stopping dragging the video capture window, the corresponding position upon the stop of dragging is a corresponding region of the video capture window in the video playing interface.

The second type: the user can adjust the position of the video capture window through the position progress bar displayed in the video playing interface. The corresponding different position in the position progress bar can indicate the position of the capture window in the video playing interface. The user can determine the corresponding region of the video capture window in the video playing interface by sliding the progress bar.

In an embodiment of the present disclosure, the adjusting the video capture window to a corresponding region in the video playing interface, in response to the window movement operation includes:
displaying a pre-configured window adjustment boundary line in the video playing interface, in response to the window movement operation, wherein, the window adjustment boundary line is configured to limit a display region of the video capture window;
determining a current display region of the video capture window based on the window movement operation and the window adjustment boundary line; and
adjusting the video capture window to a corresponding position in the video playing interface based on the current display region.

Wherein, the video playing interface has a pre-configured window adjustment boundary line. The window adjustment boundary line is used to limit the display region of the video capture window in the video playing interface. In actual applications, the window adjustment boundary line can be pre-configured based on the size of display interface of various different terminal devices, so that the content captured in the video capture window can be adaptively displayed in the display interface of any terminal device. When the window movement operation is received from the user, the pre-configured window adjustment boundary line is displayed on the video playing interface at the same time based on the configuration of window adjustment boundary line, so that the video capture window is adjusted upon adjusting the video capture window by user.

In actual applications, the video capture window can be configured as required. For example, the window adjustment boundary line may be a guideline at a pre-configured position in the video playing interface. The pre-configured position may include at least one of the top, bottom, left, and right in the video playing interface. The guideline of the corresponding position can limit the adjustment range of corresponding position of the video capture window in the video playing interface.

Figure 3:
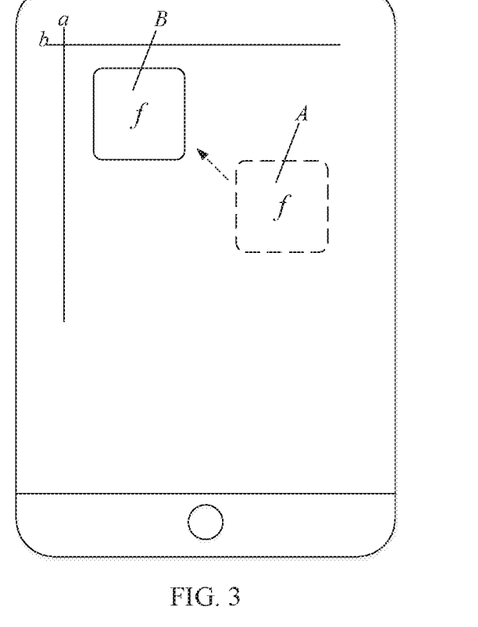
FIG. 3 is a schematic diagram of another video playing interface according to an embodiment of the present disclosure.

In the schematic diagram of a video playing interface shown in FIG. 3, as an example, two guidelines at the top and left of the video playing interface are used as window adjustment lines (i.e., window adjustment boundary lines a and b). The user can trigger the window adjustment operation by dragging the video capture window f. Upon receiving this operation, the window adjustment boundary lines a and b will be displayed in the video playing interface. The window adjustment boundary lines a and b are two mutually perpendicular lines. In actual applications, in order to facilitate user identification, the window adjustment boundary lines a and b can be marked by marked colors, such as red, or the window adjustment boundary lines a and b can be marked by different shapes, such as zigzag. In this example, the user drags the video capture window f from position A to position if Based on the position B, the video capture window f is adjusted to a position corresponding to the position B in the video playing interface to adjust the video capture window.

In the embodiment of the present disclosure, the determining a current display region of the video capture window based on the window movement operation and the window adjustment boundary line includes:

determining a first display region of the video capture window based on the window movement operation;

determining the first display region as the current display region, if a distance between the first display region and any one of window adjustment boundary lines is not less than a set distance; and determining a second display region as the current display region, if the distance between the first display region and any one of the window adjustment boundary lines is less than the set distance;

wherein, the second display region is a region generated by translating the first display region to any one of the window adjustment boundary lines, and at least one position point of the second display region overlaps with any one of the window adjustment boundary lines.

Wherein, the video capture window has a relatively good display position within the adjustment range defined by the window adjustment boundary lines, such as a display region near the window adjustment boundary lines. During the adjustment of the video window by user, in addition to a user who requires a display region of the video capture window in the video playing interface, another user can adjust the video capture window to a relatively good position in the video playing interface by adjusting the distance between the display region of the video capture window and the window boundary line during the adjustment process.

In one or more embodiments of present disclosure, in the process of adjusting the video capture window, when the distance between the first display region of the video capture window and any window adjustment boundary line is not less than the set distance, it indicates that the user may wish to adjust the video capture window to a display position of the non-edge region of the video playing interface. The first display region can be used as a region to be adjusted by the video capture window, that is, the current display region. When the distance between the first display region and any one of the window adjustment boundary lines is less than the set distance, it indicates that the user may wish to adjust the video capture window to the edge region of the video playing interface to reduce the occlusion of the original video playing interface. At this time, the current display region may be determined as the second display region at the boundary line.

In actual applications, if the video capture window is rectangular and the window adjustment boundary lines are straight lines, the first display region is rectangular, and the region generated by translating the first display region to any one of the window adjustment boundary lines is a region where any one of the boundary lines of the first display region overlaps with any one of the window adjustment boundary lines. If the video capture window is circular and the window adjustment boundary lines are straight lines, the first display region is circular, and the region generated by translating the first display region to any one of the window adjustment boundary lines is a region where at least one position point of the first display region overlaps with any one of the window adjustment boundary lines. It can be understood that upon an adjustment boundary line existing, no matter how the capture window is adjusted, the display region of the capture window cannot exceed the boundary line.

In an embodiment of the present disclosure, the capturing a user video in response to the video capture operation, and displaying the user video via the video capture window includes:

capturing the user video while playing the original video, in response to the video capture operation, and displaying the user video via the video capture window.

Wherein, in order to make the comment content in the user video corresponding to the content in the original video, the user video can be recorded while the original video is playing, that is, when the video capture operation is received, the user video is captured and the original video is played synchronously. This can realize the function of synchronous recording of the user video upon playing the original video, so that the user can synchronously record the feeling content or comment content in the user video based on the video content played in the original video during the recording of the user video, thereby improving interaction experience of user.

In actual applications, if the original video is in the playing state before receiving the video capture operation of the user through the video playing interface for the original video, the original video is automatically paused or the user pauses the original video upon receiving the video capture operation of the user, then when receiving a video capture operation, the user can play the paused original video, capture a user video, and display the user video through the video capture window.

In an embodiment of the present disclosure, the method further includes:

receiving a window size adjustment operation with respect to the video capture window, from the user; and adjusting the video capture window to a corresponding display size, in response to the window size adjustment operation.

Wherein, the size of the video capture window can be set according to a pre-configured default value, or can be adjusted by the user based on actual requirements of the user. In actual applications, the video playing interface includes associated trigger identifier for triggering window size adjustment operation, such as a specified trigger button or input box, or a voice command of user. In one or more embodiments of present disclosure, it can be a "window" virtual button on the video playing interface. The user can trigger the window size adjustment operation through this button, and the size of the video capture window can be adjusted through the operation.

In an embodiment of the present disclosure, the method further includes:

receiving a special effect addition operation with respect to a special effect to be added, from the user, via the video playing interface; and adding the special effect to be added to the user video, in response to the special effect addition operation.

Wherein, in order to meet the video capture requirements of different users, it is also possible to provide users with the function of adding special effect to the user video, that is, adding the selected special effect to be added to the user video through the special effect addition operation of user. The special effect to be added may be added before capturing the user video, or may be added during capturing the user video, or may be added after completing to capture the user video, and the occasion of adding the special effect is not limited in the present disclosure.

In actual applications, the function of adding special effect to the user video can be implemented in at least one of the following ways:

The first type: the special effect addition function can be implemented through the "special effect" virtual button displayed in the video playing interface. The operation of the user clicking the button is a special effect addition operation with respect to a special effect to be added, from the user, and the special effect corresponding to the button is added to the user video.

The second type: the special effect can be added by sliding the display interface for the user video, and the user can add corresponding special effects to the user video by sliding the display interface for the user video left or right through the operating object, such as a finger.

In an embodiment of the present disclosure, the method further includes: before capturing a user video in response to the video capture operation, and displaying the user video via the video capture window,
  receiving a recording selection operation with respect to a recording mode for the user video, from the user, via the video playing interface, wherein, the recording mode includes at least one of a fast recording mode, a slow recording mode, and a standard recording mode; and
  determining the recording mode for the user video based on the recording selection operation,
  wherein, in order to meet the requirements of different users, before capturing the user video, the user may be provided with a function of selecting a recording mode for the user video, that is, the user video is recorded according to the selected recording mode through the recording selection operation from the user. The recording rate of the fast recording mode, the recording rate of the standard recording mode, and the recording rate of the slow recording mode are successively slowed down. Through the selection of different recording modes, the function of recording user video at a variable speed can be realized, which further improves interactive experience of user.

It can be understood that the fast, slow, and standard among the above fast recording mode, slow recording mode, and standard recording mode are relative. The recording rates of different recording modes are different. The recording rate of each recording mode can be configured as required. For example, the fast recording mode refers to a recording mode with a recording rate of a first rate, the slow recording method refers to a recording mode with a recording rate of a second rate, and the standard recording mode refers to a recording method with a recording rate of a third rate. The first rate is greater than the third rate, the third rate is greater than the second rate.

In an embodiment of the present disclosure, the method further includes:
  combining the user video and the original video to obtain a combined video.

Wherein, the combining way of the user video and the original video can be configured as required. The user video can be combined with the original video during capturing the user video, or the user video and the original video can be combined after capturing the user video, and the obtained combined video includes the content of the original video and the content of the user video. Through the combined video, the user video can be viewed while viewing the original video, and when the user video is the reaction video of user, the viewing reactions or thoughts of user on the original video can be learned by viewing the combined video.

In the embodiment of the present disclosure, a video frame image (i.e., video frame) of the combined video includes video frame images of the user video and video frame images of the original video, wherein, the video frame images of the user video are displayed in the video frame images of the original video.

It should be noted that, in the method for capturing video provided by the embodiment of the present disclosure, when the original video and the user video are combined to obtain a combined video, the video frame image of the user video and the corresponding video frame image of the original video are combined, the audio information corresponding to the video frame image of the user video and the audio information corresponding to the corresponding video frame image of the original video are combined, and then the combined video frame image and the corresponding audio information are combined, to obtain a combined video. Wherein, optionally, when the video frame image and the video frame image are combined, it means that the corresponding two video frame images are combined into one frame image, and the video frame image of the user video in the synthesized one frame image is located in the video frame image of the original video. When the original video and the user video are combined to obtain a combined video, the size of the video frame image of the user video is smaller than the size of the video frame image of the original video.

In an example, for example, the duration of the user video is 10 s, and the duration of the original video is also 10 s. When the video frame images of the user video and the corresponding video frame images of the original video are combined, the fist video frame image in the user video is combined with the first video frame image in the original video, and the obtained video frame image is the first video frame image in the corresponding combined video, and according to the same combined method described above, each video frame image in the user video is sequentially combined with each video frame image in the corresponding original video, to obtain a combined video.

Figure 4:
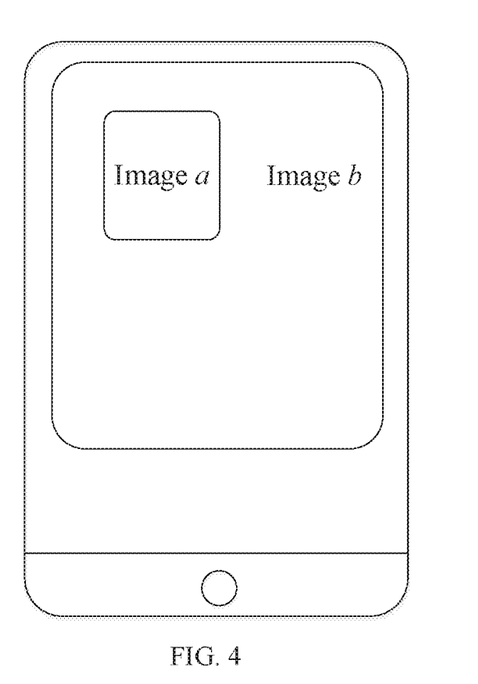
FIG. 4 is a schematic diagram of still another video playing interface according to an embodiment of the present disclosure.

As an example, FIG. 4 shows a schematic diagram of a video frame image in one frame of combined video obtained after a video frame image in one frame of user video combining with a video frame image in one frame of original video. As shown in the figure, the image a is part of the video frame image in the original video, the image b is part of the video frame image in the user video, and the image shown in the figure after combining the image a and the image b is the combined video frame image.

In an embodiment of the present disclosure, the method further includes:
  receiving a volume adjustment operation from the user via the video playing interface; and
  adjusting volumes of an audio information of the user video and/or an audio information of the original video accordingly, in response to the volume adjustment operation.

Wherein, in order to further improve the interactive experience of user, the volume of the original video and/or the user video can also be adjusted to meet the video playing requirements of different users. In actual applications, if the user does not need to adjust the volume of the original video and the user video, the volume of the captured user video may be a pre-configured volume, for example, a volume consistent with the volume of the original video, or a preset volume.

In actual applications, the volume can be adjusted through the volume adjustment virtual button in the video playing interface. The volume adjustment virtual button can be a volume adjustment progress bar, and the adjustment of volume of the original video and volume of the user video can correspond to two volume adjustment progress bars, such as volume adjustment progress bar a and volume adjustment progress bar b. The volume of the original video is adjusted by the volume adjustment progress bar a, and the volume of the user video is adjusted by the volume adjustment progress bar b. Different volume adjustment progress bars are distinguished by different identifiers.

Figure 5A:
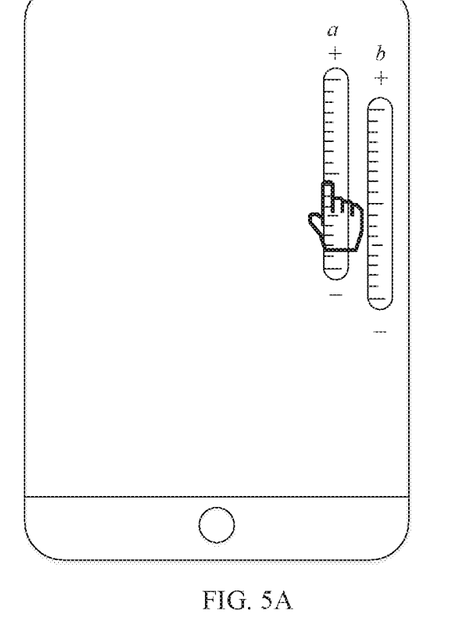
FIG. 5A is a schematic diagram of a volume adjustment mode according to an embodiment of the present disclosure.
Figure 5B:
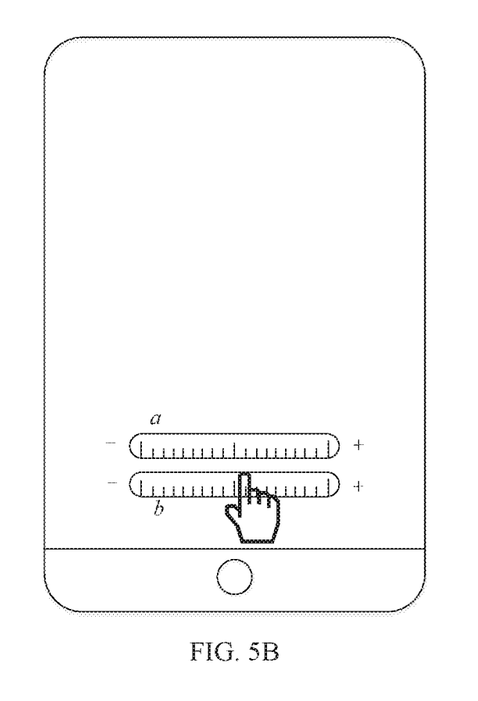
FIG. 5B is a schematic diagram of another volume adjustment mode according to an embodiment of the present disclosure.

As an example, a schematic diagram of a volume adjustment method is shown in FIG. 5A. The user can adjust the volume by sliding the volume adjustment progress bars a and b which are used to adjust the volume of an original video and that of a user's video respectively, and sliding to the top of the interface (that is, the direction of the "+" identifier) indicates that the volume is increased, sliding to the down of the interface (that is, the direction of the "−" identifier) indicates that the volume is reduced. According to the actual requirements, the volume adjustment progress bars a and b can also be set as the horizontal direction, that is, as shown in another schematic diagram of the volume adjustment mode shown in FIG. 5B, and sliding to the left of the interface (that is, the direction of the "-" identifier) indicates that the volume is reduced, sliding to the right of the interface (that is, the direction of the "+" identifier) indicates that the volume is increased.

It should be noted that, in actual applications, the volume adjustment interface and the video playing interface may be the same display interface or different display interfaces. If the volume adjustment interface and the video playing interface are different display interfaces, when the volume adjustment operation of user is received through the video playing interface, the volume adjustment interface can be displayed, and the volume adjustment can be performed through this interface. Optionally, in order to not affect the recording and playing of the video, the volume adjustment interface is superimposed on the video playing interface, such as displaying at the edge position of the video playing interface.

In an embodiment of the present disclosure, the method further includes:
providing an operation prompt option to the user, wherein, the operation prompt option is used to provide the user with a prompt information of a capture operation for the combined video upon receiving an operation from the user.

Wherein, If the user video is captured to obtain a combined video upon using the combining function by the user, that is, based on the original video, the user can be prompted how to implement the combining function through the prompt operation option. In actual applications, the prompt operation option can be displayed in the video playing interface through the "help" virtual button. The user can get corresponding prompt information by clicking the button. The prompt information can be displayed to the user in the form of operation preview, or prompted the user how to operate through word, and the form of the prompt information is not limited in this disclosure.

In the embodiment of the present disclosure, combining the user video and the original video to obtain a combined video may include:
combining an audio information of the user video and an audio information of the original video to obtain an audio information of the combined video;
combining a video information of the user video and a video information of the original video to obtain a video information of the combined video: and
combining the audio information of the combined video and the video information of the combined video to obtain the combined video.

Wherein, the video includes a video information and an audio information. In the process of combining the user video and the original video, the respective video information and audio information can be combined separately (in a superimposition manner), and finally the video information and audio information after combining are combined. Through the above combining way, the information processing can be facilitated.

In the embodiment of the present disclosure, the method may further include: after combining the user video and the original video to obtain a combined video,
receiving a video save operation and/or a video posting operation of user; and
storing the combined video locally in response to the video save operation, and/or posting the combined video in response to the video posting operation.

Wherein, after obtaining the combined video, the user can be provided with the function of posting and/or saving the combined video, that is, the combined video is posted to a designated video platform through the video posting operation of user to realize the sharing of the combined video. Alternatively, the combined video is stored locally through the video saving operation of user to realize the viewing of user. In actual applications, after obtaining the combined video, the interface can jump to the video posting interface and receive the video posting operation from the user through the video posting interface, or the video posting operation from the user can be directly received through the video playing interface. Wherein, the video posting operation can be obtained by the user clicking the "post" virtual button.

In an embodiment of the present disclosure, the posting a combined video in response to the video posting operation may include:
obtaining a permission for viewing e combined video from user, in response to the video posting operation; and
posting the combined video based on the permission for viewing the combined video.

Wherein, in order to meet privacy requirements of user for combined video, the user is provided with the function of configuring the permission for viewing the combined video, that is, the permission for viewing the combined video from the user is obtained through the video posting operation from the user, and the combined video is posted through the permission for viewing the combined video from the user. Through the permission for viewing the combined video, the combined video can only be viewed by the user associated with the permission for viewing the combined video, and users who have not the permission for viewing the combined video cannot view the combined video. In actual applications, the permission for viewing the combined video can be pre-configured. Any combined video that needs to be posted are within the permission for viewing the combined video. The permission for viewing the combined video can also be configured upon posting the current combined video. Correspondingly, the current combined video is posted according to a configured privacy permission.

Wherein, the permission for viewing the combined video includes at least one of anyone, friends, and only himself Anyone indicates that the combined video can be viewed by anyone. Friends indicate that only the friends of user can view the combined video. Only himself indicates that only the user can view the combined video himself.

In an embodiment of the present disclosure, the method may further include:

generating a push message for the combined video; and
sending the push message to another user associated with the user, and/or another user associated with the original video.

Wherein, in order to inform another user associated with the combined video, upon posting the combined video, a push message for the combined video can be generated, and another user associated with the user and/or another associated with the original video can be informed of the posting of the combined video, through the push message. Wherein, another user associated with the user refer to a user who has an associated relationship with the user. The scope of the associated relationship can be configured as required, for example, including but not limited to, a person followed by the user or a person following the user. Another user associated with the original video refer to a user who has an associated relationship with a poster of original video, for example, including but not limited to, the poster of original video and all people involved in the original video. For example, the original video is a video that has been combined once, the poster of the original video is a user (here named with user a), and the author of initial original video corresponding to the original video before combining is a user (here named with user b), the users associated with the original video may include user a and user b.

In actual applications, upon posting a combined video, relevant following information can be added to the title of the combined video to indicate which user is expected to be informed by the poster of the combined video, and the receiver of the push message can be reflected by the form of @ a certain user.

In an example, user a follows user b, user a posts a combined video, and user a is associated with user b, that is, user a @ user b, wherein, user a @ user b can be displayed in the title of the combined video. Then, a push message for the combined video is sent to user b, so that user b knows that the user a posts the video.

In another example, although user a follows user b and user a posts a combined video, but user a does not @ user b, then user b cannot receive a push message for the combined video.

In another example, user a does not follow user b, user a posts a combined video, but user a @ user b upon posting a combined video, then user b can receive a push message for the combined video.

In the embodiment of the present disclosure, the combining the user video and the original video to obtain a combined video, if the duration of the user video is shorter than the duration of the original video may include:

determining, based on the recording start time of the user video, a first video corresponding to the recording start time in the original video and consistent with the duration of the user video; and combining the user video and the first video into a second video; and obtaining a combined video based on videos other than the first video in the original video and the second video.

Wherein, based on the playing content in the original video, the duration of the user video recorded by the user may be the same or different as the duration of the original video. Based on the content in the original video, the user may select the recording start time of the user video, so that the content of the user video corresponds to the content in the original video during playing the combined video, further improving interactive experience of user.

In an embodiment of the present disclosure, the method may further include: hiding a virtual button of a corresponding function in the video playing interface.

Figure 6A:
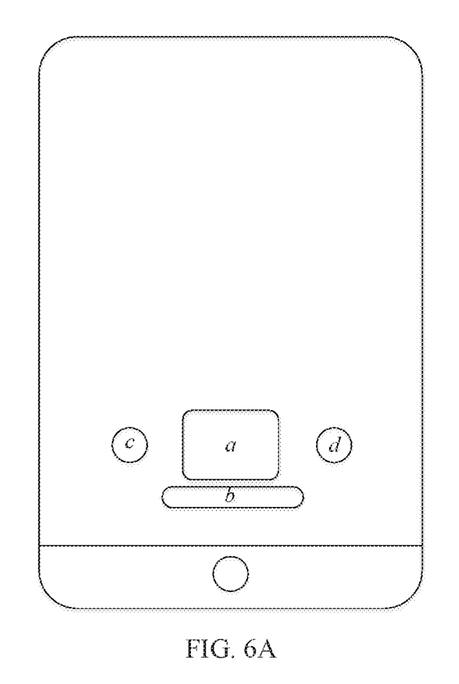
FIG. 6A is a schematic diagram of still another video playing interface according to an embodiment of the present disclosure.
Figure 6B:
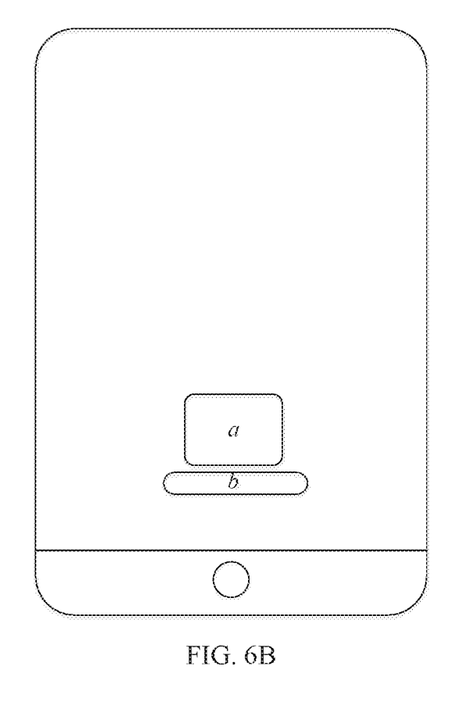
FIG. 6B is a schematic diagram of still another video playing interface according to an embodiment of the present disclosure.

In actual applications, virtual identifiers representing different functions can be displayed in the video playing interface, such as: a virtual button a indicating the start of capturing, a progress bar b indicating the capturing progress, a virtual button c indicating adding special effects, and a virtual button d indicating posting the combined video, etc. A schematic diagram of a video playing interface is as shown in FIGS. 6A and 6B. In order to further improve the interactive experience of user, other virtual identifiers in addition to the virtual button a and the progress bar b in the video playing interface in FIG. 6A can be hidden, for example, the virtual buttons c and d are hidden, and the hidden interface is shown in FIG. 6B. By hiding the virtual identifier, the video playing interface cam maintain clean.

In actual applications, a virtual button for hiding a function button can also be set in the interface. With this button, the user can determine which function buttons are hidden or displayed. In one or more embodiments of present disclosure, upon receiving a user operation on the button, the user can use this button to select which virtual buttons to hide, or select to restore the previously hidden virtual buttons.

Figure 7:
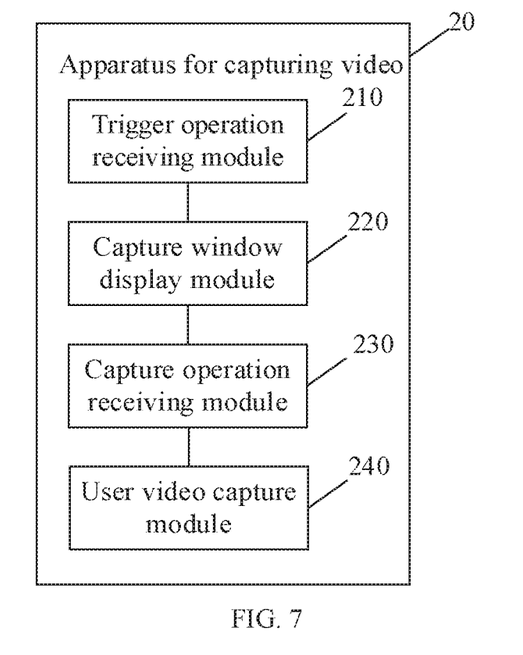
FIG. 7 is a schematic structural diagram of an apparatus for capturing video according to an embodiment of the present disclosure.

Based on the same principle as the method shown in FIG. 1, an embodiment of the present disclosure further provides an apparatus for capturing video 20. As shown in FIG. 7, the apparatus 20 may include:

a trigger operation receiving module 210, configured to receive a video capture trigger operation from the user via a video playing interface for an original video;

a capture window display module 220, configured to superimpose a video capture window on the video playing interface, in response to the video capture trigger operation;

a capture operation receiving module 230, configured to receive a video capture operation from the user via the video playing interface; and a user video capture module 240, configured to capture a user video in response to the video capture operation, and display the user video via the video capture window.

In an embodiment of the present disclosure, the apparatus further includes:

a window position adjustment module, configured to receive a window movement operation with respect to the video capture window, from the user; and adjust the video capture window to a corresponding region in the video playing interface, in response to the window movement operation.

In an embodiment of the present disclosure, the window position adjustment module may be configured to:

display a pre-configured window adjustment boundary line on the video playing interface, in response to the window movement operation, wherein, the window adjustment boundary line is configured to limit a display region of the video capture window;

determine a current display region of the video capture window based on the window movement operation and the window adjustment boundary line; and adjust the video capture window to a corresponding position in the video playing interface based on the current display region.

In an embodiment of the present disclosure, the window position adjustment module may be configured to:

determine a first display region of the video capture window based on the window movement operation;

determine the first display region as the current display region, if a distance between the first display region and any one of window adjustment boundary lines is not less than a set distance; and determine a second display region as the current display region, if the distance between the first display region and any one of the window adjustment boundary lines is less than the set distance;

wherein, the second display region is a region generated by translating the first display region to any one of the window adjustment boundary lines, and at least one position point of the second display region overlaps with any one of the window adjustment boundary lines.

In an embodiment of the present disclosure, the user video capture module 240 may be configured to:

capture the user video while playing the original video, in response to the video capture operation, and display the user video via the video capture window.

In an embodiment of the present disclosure, the apparatus further includes:

a window size adjustment module, configured to receive a window size adjustment operation with respect to the video capture window from the user; and adjust the video capture window to a corresponding display size, in response to the window size adjustment operation.

In an embodiment of the present disclosure, the apparatus further includes:

a special effect addition module, configured to receive a special effect addition operation with respect to a special effect to be added, from the user, via the video playing interface; and add the special effect to be added to the user video, in response to the special effect addition operation.

In the embodiment of the present disclosure, the user video capture module 240 may be further configured to:

before capturing a user video in response to the video capture operation and displaying the user video via the video capture window, receive a recording selection operation with respect to a recording mode for the user video, from the user, via the video playing interface; and determine the recording mode for the user video based on the recording selection operation, wherein, the recording mode may include at least one of a fast recording mode, a slow recording mode, and a standard recording mode.

In an embodiment of the present disclosure, the apparatus further includes:

a combined video generation module, configured to combine the user video and the original video to obtain a combined video.

In an embodiment of the present disclosure, the apparatus further includes:

a volume adjustment module, configured to receive a volume adjustment operation via the video playing interface, from the user; and adjust volumes of an audio information of the user video and/or an audio information of the original video accordingly, in response to the volume adjustment operation.

In an embodiment of the present disclosure, the apparatus further includes:

an operation prompt module, configured to provide an operation prompt option to the user, wherein, the operation prompt option is used to provide the user with a prompt information of a capture operation for the combined video upon receiving an operation from the user.

The apparatus for capturing video according to the embodiments of the present disclosure may execute a method for capturing video provided by the embodiments of the present disclosure, and the implementation principles are similar. The actions performed by the modules in the apparatus for capturing video in the embodiments of the present disclosure correspond to the steps in the method for capturing video in the embodiments of the present disclosure. Detailed function description of each module in the apparatus for capturing video may refer to the description in the corresponding method for capturing video shown in the foregoing, which is not repeated here.

Based on the same principle as the method for capturing video in the embodiments of the present disclosure, the present disclosure provides an electronic device including a processor and a memory, wherein, the memory is configured to store computer operation instruction; and the processor is configured to execute the method as shown in any one of embodiments in the first aspect of the present disclosure by invoking the computer operation instruction.

Based on the same principle as the method for capturing video in the embodiments of the present disclosure, the present disclosure provides a computer-readable storage medium that stores at least one operation, at least one program, code set or operation set, which is loaded and executed by a computer to implement the method as shown in any one of the embodiments in the method for capturing video of the present disclosure.

Figure 8:
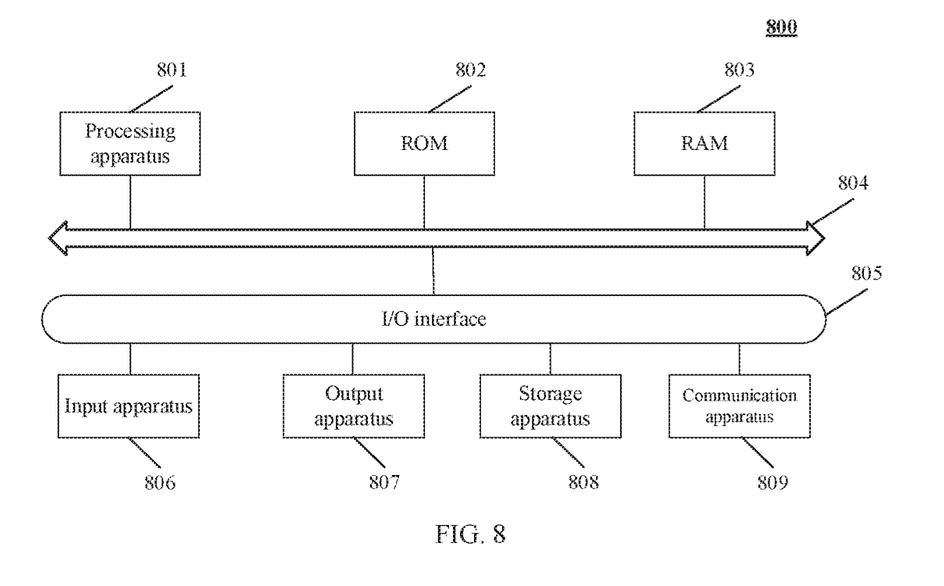
FIG. 8 is a schematic structural diagram of an electronic device according to an embodiment of the present disclosure.

In an example, as shown in FIG. 8, it shows a schematic structural diagram of an electronic device 800 (such as a terminal device or server that implements the method shown in FIG. 1) suitable for implementing the embodiment of the present disclosure. The electronic device in the embodiment of the present disclosure may include, but not limited to, a mobile terminal, such as a mobile phone, a notebook computer, a digital broadcast receiver, a PDA (personal digital assistant), a PAD (tablet computer), a PMP (portable multimedia player), a vehicle-mounted terminal (for example, vehicle navigation terminal), etc., and a fixed terminal, such as a digital TV, a desktop computer, etc. The electronic device shown in FIG. 8 is only an example, and should not construct any limitation on the function and scope of use of the embodiments of the present disclosure.

As shown in FIG. 8, the electronic device 800 may include a processing apparatus (e.g., a central processing unit, a graphics processor, etc.) 801 that may execute various actions and processing according to the program stored in the read-only memory (ROM) 802 or program loaded from a storage apparatus to the random access memory (RAM) 803. The RAM 803 also stores various programs and data required for the operation of the electronic device 800. The processing apparatus 801, the ROM 802, and the RAM 803 are connected to each other through a bus 804. An input/output (I/O) interface 805 is also connected to the bus 804.

In general, the following apparatus may be connected to the I/O interface 805: an input apparatus 806 including, for example, a touch screen, a touch pad, a keyboard, a mouse, a camera, a microphone, an accelerometer, a gyroscope and the like; an output apparatus 807 including, for example, a liquid crystal display (LCD), a speaker, a vibration and the like; a storage 808 including, for example, a magnetic tape and a hard disk and the like; and a communication apparatus 809. The communication apparatus 809 may allow the electronic device 800 to communicate wirelessly or by wire with other devices to exchange data. Although FIG. 8 illustrates an electronic device 800 having various apparatus, it should be understood that it is not required to implement or have all of the illustrated devices. Alternatively, more or less devices may be implemented.

In particular, the processes described above with reference to the flowcharts may be implemented as a computer software program according to an embodiment of the present disclosure. For example, an embodiment of the present disclosure includes a computer program product including a computer program loaded on a computer readable medium, and the computer program contains program codes for executing the method shown in the flowchart. In such an embodiment, the computer program may be downloaded and installed from the network via the communication apparatus 809, or installed from the storage apparatus 808, or installed from the ROM 802. When the computer program is executed by the processing apparatus 801, the above functions defined in the method of the embodiments of the present disclosure are executed.

It should be noted that the above computer readable medium of the present disclosure may be a computer readable signal medium or a computer readable storage medium or any combination of the above two. The computer readable storage medium may be, for example, but is not limited to, an electronic, magnetic, optical, electromagnetic, infrared, or semiconductor system, apparatus, or device, or any combination of the above. More specific examples of the computer readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that may contain or store programs, which may be used by or in connection with an instruction execution system, apparatus, or device. In the present disclosure, a computer readable signal medium may include a data signal that is propagated in the baseband, or propagated as part of a carrier, carrying computer readable program codes. Such propagated data signals may take various forms, which includes, but is not limited to, electromagnetic signals, optical signals, or any suitable combination of the above. The computer readable signal medium may also be any computer readable medium except for a computer readable storage medium, and the computer readable signal medium may transmit, propagate or transport a program for use by or in connection with an instruction execution system, apparatus or device. Program codes contained on the computer readable medium may be transmitted by any suitable medium, which includes but is not limited to: wire, fiber optic cable, RF (radio frequency), and the like, or any suitable combination of the above.

The above computer readable medium may be contained in the above electronic device; or may be separately present and is not incorporated in the electronic device.

The computer readable medium carries one or more programs, when the one or more programs are executed by the electronic device, causing the electronic device to: acquire at least two internet protocol addresses; and send the node evaluation request including at least two internet protocol addresses to the node evaluation device, wherein the node evaluation device selects and return an internet protocol address from the at least two internet protocol addresses; receive the internet protocol address returned by the node evaluation device; wherein the acquired internet protocol address indicates the edge nodes in the content distribution network.

Alternatively, the computer readable medium carries one or more programs, when the one or more programs are executed by the electronic device, causing the electronic device to: receive a node evaluation request including at least two internet protocol addresses; select the internet protocol address from the at least two internet protocol addresses, and return the selected internet protocol address; wherein the received internet protocol address indicates an edge node in the content distribution network.

Computer program codes for executing the operations of the present disclosure may be written in one or more programming languages, or combinations thereof, wherein the programming languages includes an object-oriented programming language such as Java, Smalltalk, C++, and also includes conventional procedural programming language such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

What is claimed is:

1. A method for capturing video, comprising:
receiving a video capture trigger operation from a user via a video playing interface for an original video;
superimposing a video capture window on the video playing interface in response to the video capture trigger operation, wherein the video capture window is configured to record a user video comprising the user's comment on or reaction to the original video, the video capture window is within the video playing interface for the original video, and the video capture window is smaller than the video playing interface for the original video;
receiving a video capture operation from the user via the video playing interface;
synchronously capturing the user video while playing the original video in response to the video capture operation, and displaying the user video via the video capture window; and
combining the user video and the original video to obtain a combined video during the synchronously capturing the user video, wherein the combining the user video and the original video to obtain the combined video during the synchronously capturing the user video further comprises:
combining video information of the user video and video information of the original video to obtain video information of the combined video during the synchronously capturing the user video, wherein the combining video information of the user video and video information of the original video to obtain video information of the combined video during the synchronously capturing the user video further comprises:
  combining an initial video frame image in the user video with a first corresponding video frame image in the original video to obtain a first video frame image in the combined video, wherein the first corresponding video frame image in the original video is determined based on a start time of recording the user video, and
  sequentially combining subsequent video frame images in the user video with corresponding video frames in the original video to obtain subsequent video frame images in the combined video,
combining audio information corresponding to video frame images in the user video and audio information corresponding to the corresponding video frames in the original video to obtain audio information of the combined video during the synchronously capturing the user video, wherein a volume of the audio information of the user video and a volume of the audio information of the original video are adjustable via respective volume adjustment progress bars, and
combining the audio information of the combined video and the video information of the combined video to obtain the combined video during the synchronously capturing the user video.

2. The method according to claim 1, further comprising:
receiving a window movement operation with respect to the video capture window, from the user; and
adjusting the video capture window to a corresponding region in the video playing interface, in response to the window movement operation.

3. The method according to claim 2, wherein, the adjusting the video capture window comprises:
displaying a pre-configured window adjustment boundary line in the video playing interface, in response to the window movement operation, wherein, the window adjustment boundary line is configured to limit a display region of the video capture window;
determining a current display region of the video capture window based on the window movement operation and the window adjustment boundary line; and
adjusting the video capture window to a corresponding position in the video playing interface based on the current display region.

4. The method according to claim 3, wherein, the determining a current display region comprises:
determining a first display region of the video capture window based on the window movement operation;
determining the first display region as the current display region, if a distance between the first display region and any one of window adjustment boundary lines is not less than a set distance; and
determining a second display region as the current display region, if the distance between the first display region and any one of the window adjustment boundary lines is less than the set distance;
wherein, the second display region is a region generated by translating the first display region to any one of the window adjustment boundary lines, and at least one position point of the second display region overlaps with any one of the window adjustment boundary lines.

5. The method according to claim 1, wherein, the capturing a user video and displaying the user video comprises:
capturing the user video while playing the original video, in response to the video capture operation, and displaying the user video via the video capture window.

6. The method according to claim 1, further comprising:
receiving a window size adjustment operation with respect to the video capture window from the user; and
adjusting the video capture window to a corresponding display size, in response to the window size adjustment operation.

7. The method according to claim 1, further comprising:
receiving a special effect addition operation with respect to a special effect to be added, from the user, via the video playing interface; and
adding the special effect to be added to the user video, in response to the special effect addition operation.

8. The method according to claim 1, wherein, before capturing a user video, the method further comprise:
receiving a recording selection operation with respect to a recording mode for the user video, from the user, via the video playing interface, wherein, the recording mode comprises at least one of a fast recording mode, a slow recording mode, and a standard recording mode; and
determining the recording mode for the user video based on the recording selection operation.

9. The method according to claim 1, further comprising:
receiving a volume adjustment operation via the video playing interface, from the user; and
adjusting volumes of an audio information of the user video and/or an audio information of the original video accordingly, in response to the volume adjustment operation.

10. The method according to claim 1, further comprising:
providing an operation prompt option to the user, wherein, the operation prompt option is used to provide the user with a prompt information of a capture operation for the combined video upon receiving an operation from the user.

11. An electronic device, comprising:
a memory, configured to store a computer operation instruction; and
a processor, configured to execute a method for capturing video, by invoking the computer operation instruction, wherein the method comprises:
receiving a video capture trigger operation from a user via a video playing interface for an original video;
superimposing a video capture window on the video playing interface in response to the video capture trigger operation, wherein the video capture window is configured to record a user video comprising the user's comment on or reaction to the original video, the video capture window is within the video playing interface for the original video, and the video capture window is smaller than the video playing interface for the original video;
receiving a video capture operation from the user via the video playing interface;
synchronously capturing the user video while playing the original video in response to the video capture operation, and displaying the user video via the video capture window; and
combining the user video and the original video to obtain a combined video during the synchronously capturing the user video, wherein the combining the user video and the original video to obtain the combined video during the synchronously capturing the user video further comprises:
combining video information of the user video and video information of the original video to obtain video information of the combined video during the synchronously capturing the user video, wherein the combining video information of the user video and video information of the original video to obtain video information of the combined video during the synchronously capturing the user video further comprises:
combining an initial video frame image in the user video with a first corresponding video frame image in the original video to obtain a first video frame image in the combined video, wherein the first corresponding video frame image in the original video is determined based on a start time of recording the user video, and
sequentially combining subsequent video frame images in the user video with corresponding video frames in the original video to obtain subsequent video frame images in the combined video,
combining audio information corresponding to video frame images in the user video and audio information corresponding to the corresponding video frames in the original video to obtain audio information of the combined video during the synchronously capturing the user video, wherein a volume of the audio information of the user video and a volume of the audio information of the original video are adjustable via respective volume adjustment progress bars, and
combining the audio information of the combined video and the video information of the combined video to obtain the combined video during the synchronously capturing the user video.

12. A non-transitory computer-readable storage medium that stores at least one operation, at least one program, code set or instruction set, which is loaded and executed by a computer to implement a method for capturing video comprising:
receiving a video capture trigger operation from a user via a video playing interface for an original video;
superimposing a video capture window on the video playing interface in response to the video capture trigger operation, wherein the video capture window is configured to record a user video comprising the user's comment on or reaction to the original video, the video capture window is within the video playing interface for the original video, and the video capture window is smaller than the video playing interface for the original video;
receiving a video capture operation from the user via the video playing interface;
synchronously capturing the user video while playing the original video in response to the video capture operation, and displaying the user video via the video capture window; and
combining the user video and the original video to obtain a combined video during the synchronously capturing the user video, wherein the combining the user video and the original video to obtain the combined video during the synchronously capturing the user video further comprises:
combining video information of the user video and video information of the original video to obtain video information of the combined video during the synchronously capturing the user video, wherein the combining video information of the user video and video information of the original video to obtain video information of the combined video during the synchronously capturing the user video further comprises:
combining an initial video frame image in the user video with a first corresponding video frame image in the original video to obtain a first video frame image in the combined video, wherein the first corresponding video frame image in the original video is determined based on a start time of recording the user video, and
sequentially combining subsequent video frame images in the user video with corresponding video frames in the original video to obtain subsequent video frame images in the combined video,
combining audio information corresponding to video frame images in the user video and audio information corresponding to the corresponding video frames in the original video to obtain audio information of the combined video during the synchronously capturing the user video, wherein a volume of the audio information of the user video and a volume of the audio information of the original video are adjustable via respective volume adjustment progress bars, and
combining the audio information of the combined video and the video information of the combined video to obtain the combined video during the synchronously capturing the user video.

* * * * *